Jan. 7, 1947. H. L. MILLER 2,414,055
APPARATUS FOR CATCHING SHRIMP
Filed Feb. 15, 1944 4 Sheets-Sheet 3
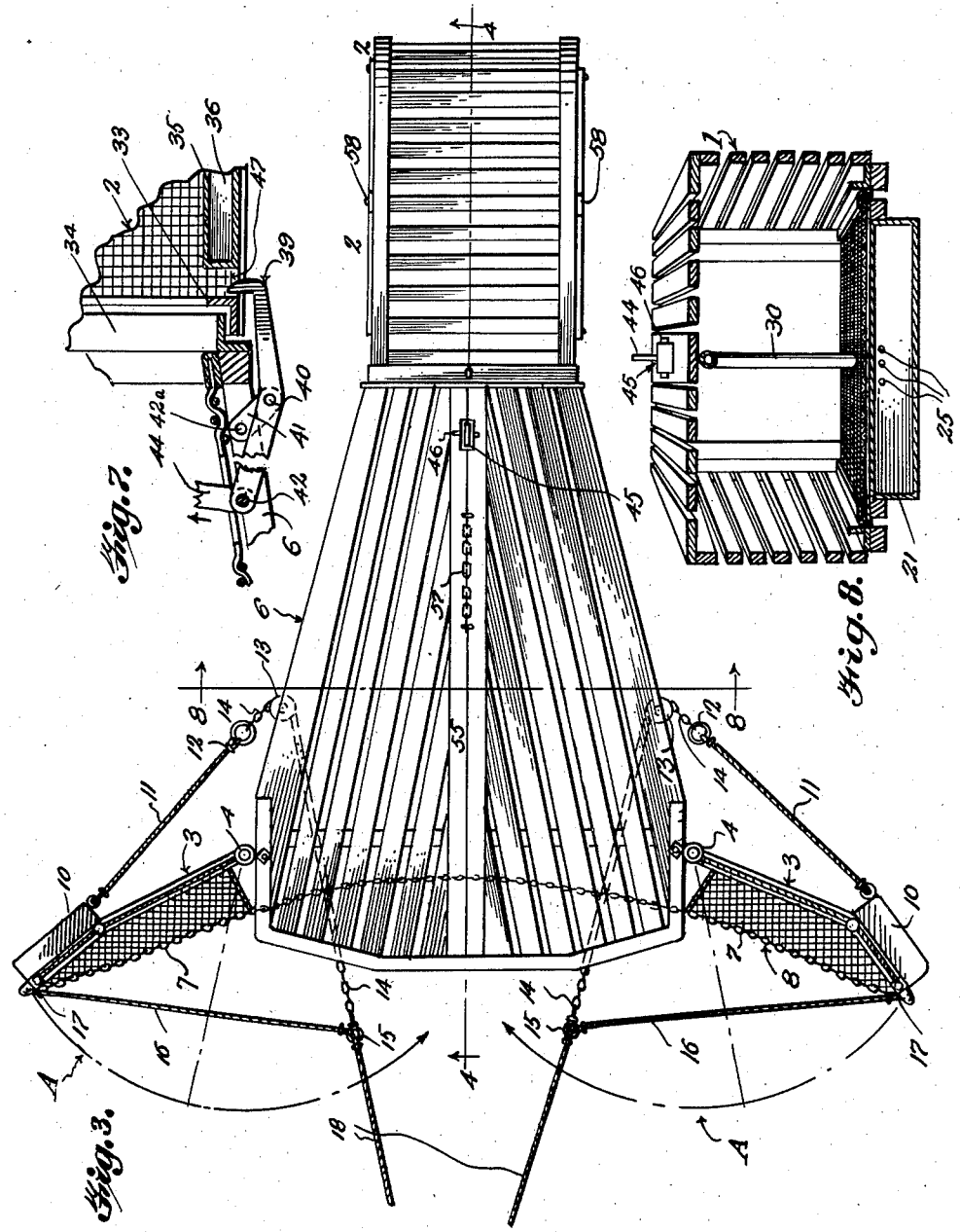
Inventor,
HENRY L. MILLER.
By E. E. Vrooman & Co.,
His Attorneys.

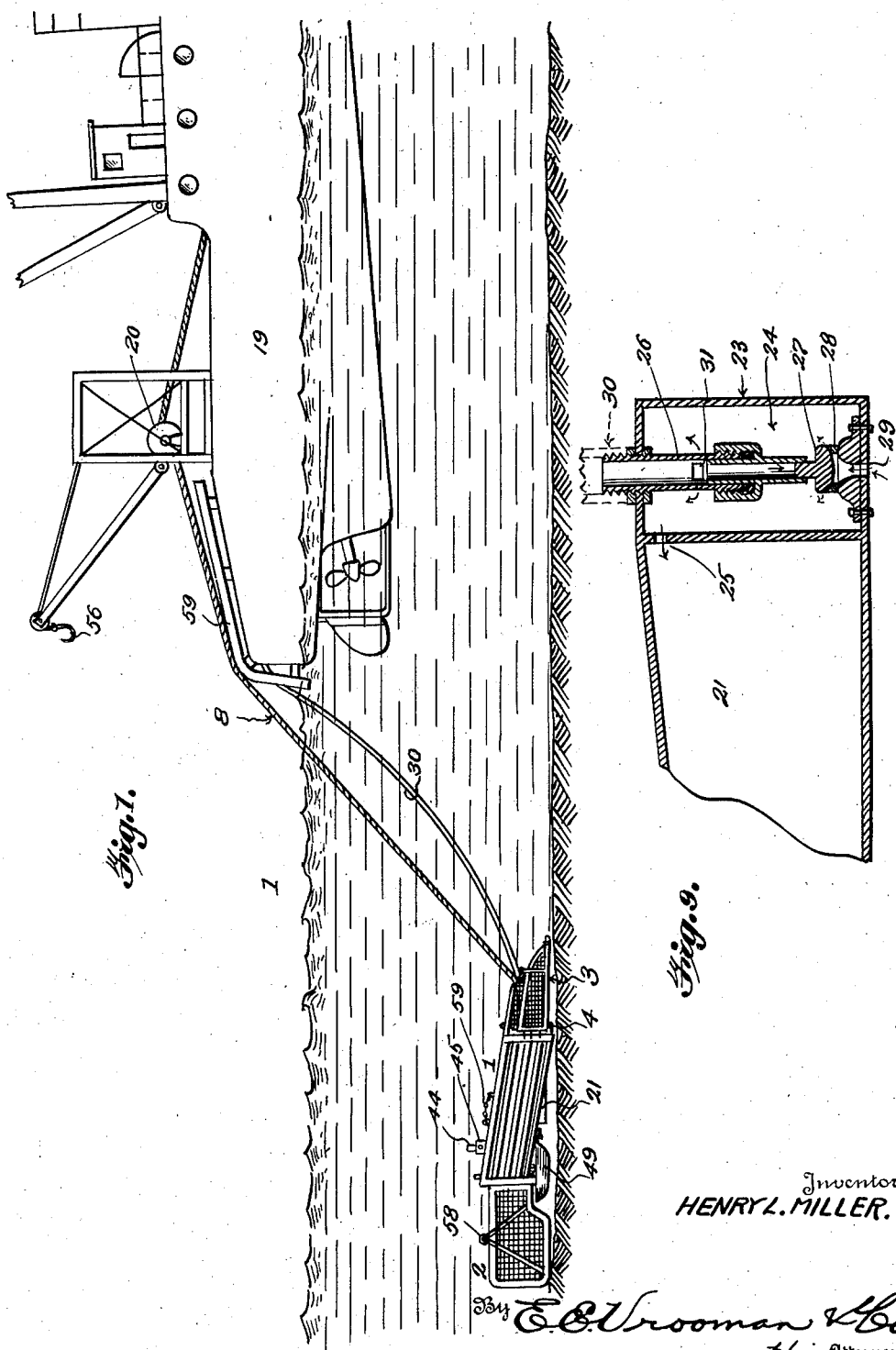

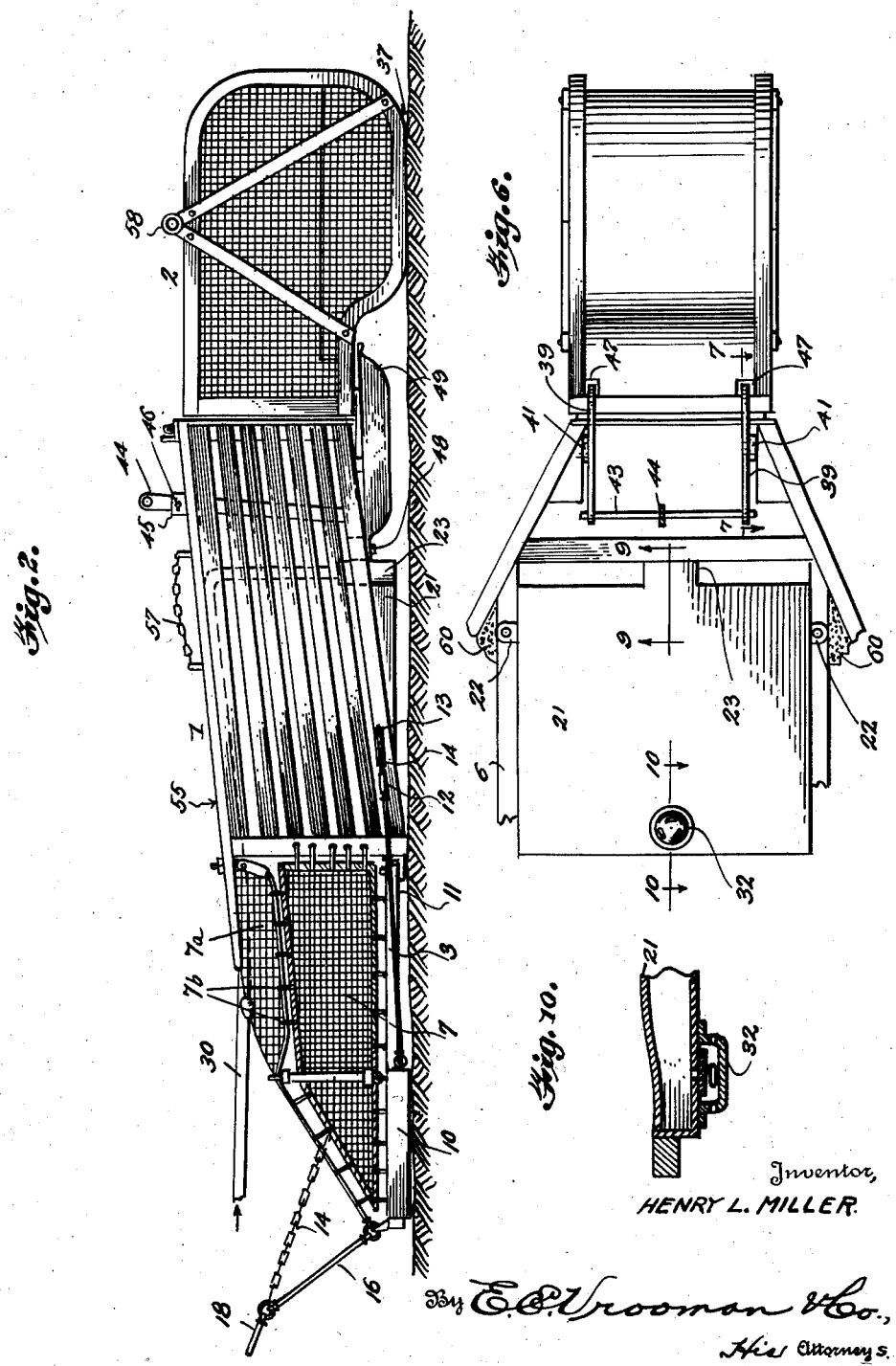

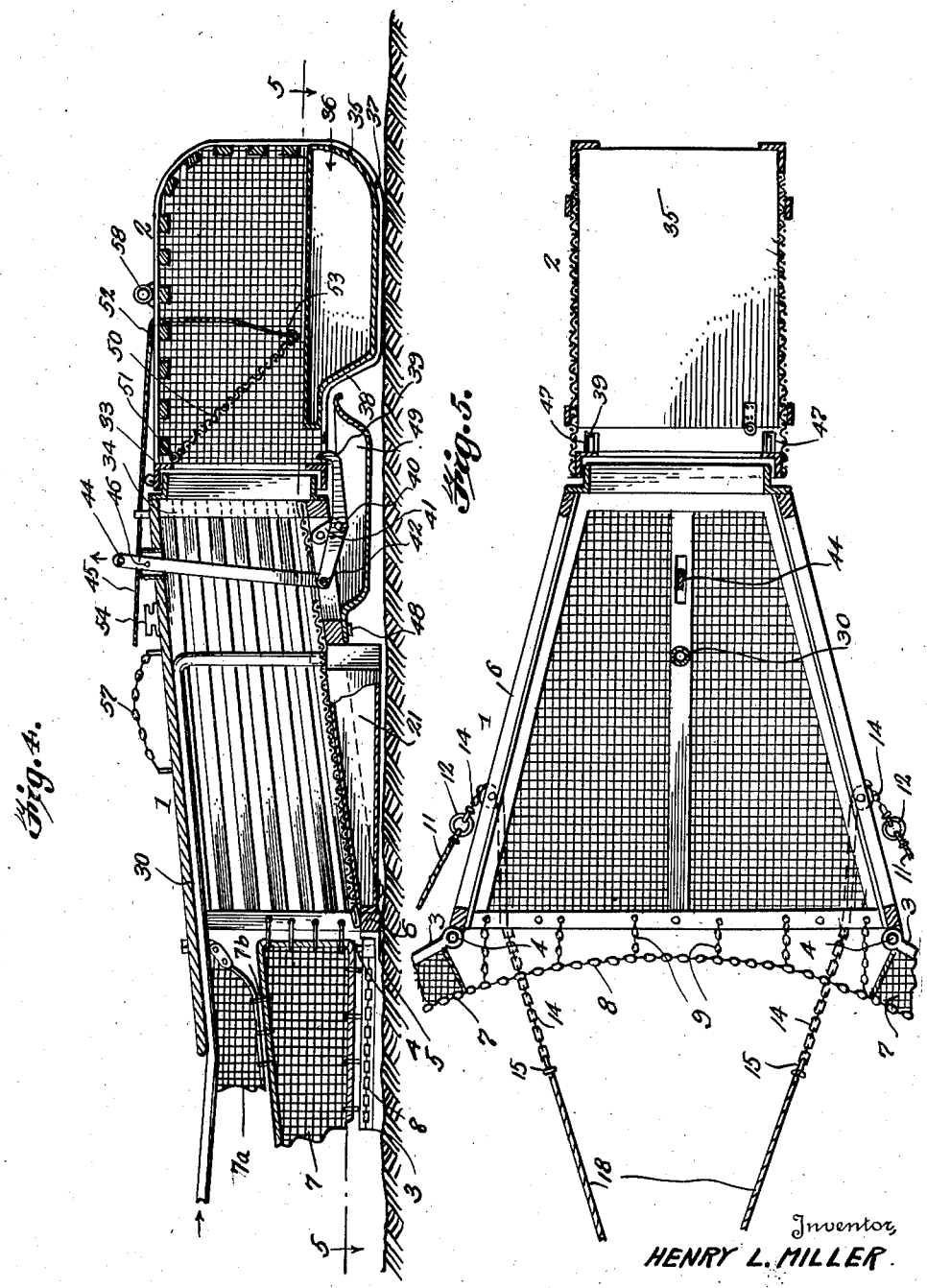

Patented Jan. 7, 1947

2,414,055

UNITED STATES PATENT OFFICE 2,414,055

APPARATUS FOR CATCHING SHRIMP

Henry L. Miller, Mobile, Ala.

Application February 15, 1944, Serial No. 522,468

6 Claims. (Cl. 43—4)

This invention relates to an apparatus for catching shrimp.

An object of the invention is the construction of a comparatively simple and efficient apparatus which can be easily attached to a trawler, and is provided with means for easily raising and lowering the same.

Another object of the invention is the construction of a shrimp catching apparatus provided with a primary section in which the catch is first lodged and a trailer or auxiliary section in which the catch is finally lodged, the two sections being detachably connected together during the passage of the apparatus along the bottom of a body of water, such as a bay, gulf, or ocean.

A still further object of the invention is the provision of efficient float means on the sections of the apparatus.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a view in elevation showing the shrimp catching apparatus constructed in accordance with this invention, attached to and being drawn along the bed of the water by a trawler.

Figure 2 is an enlarged view in side elevation of the shrimp catching apparatus.

Figure 3 is a top plan view.

Figure 4 is a vertical sectional view taken on line 4—4, Figure 3, and looking in the direction of the arrows.

Figure 5 is a horizontal sectional view taken on line 5—5, Figure 4, and looking in the direction of the arrows.

Figure 6 is a fragmentary bottom view of the apparatus.

Figure 7 is an enlarged sectional view taken on line 7—7, Figure 6, and looking in the direction of the arrows.

Figure 8 is a transverse sectional view taken on line 8—8, Figure 3, and looking in the direction of the arrows.

Figure 9 is an enlarged sectional view taken on line 9—9, Figure 6, and looking in the direction of the arrows.

Figure 10 is an enlarged sectional view taken on line 10—10, Figure 6, and looking in the direction of the arrows.

Referring to the drawings, in which the preferred embodiment of the invention is illustrated, 1 designates the primary cage or section and 2 is the trailer or auxiliary section. The primary section 1 is provided on its front with two seine gates 3. Each seine gate 3 is pivotally mounted at 4 upon a suitable bracket 5 (Fig. 4) that is fastened to the frame 6 of the primary section 1. Each seine gate 3 is provided with a lower net 7, to the lower edge of which is attached drag chain 8. This drag chain is attached between its ends by auxiliary chains 9 to frame 6 (Fig. 5). Each gate 3 has an upper net 7a attached to lower net 7 by loops 7b. When the gates are in their open position, as shown in Figures 3 and 5, the drag chain moves along the bottom, stirring up the shrimp and causing them to jump or move, and as the apparatus moves forward, the nets 7 of the seine gates direct the shrimp into the primary section 1. Each seine gate is provided with a head block 10 (Fig. 3) to which is attached a rope 11. One end of each rope 11 is fastened to a large link or ring 12, which acts as a stop, preventing rope 11 from being drawn through the sheave 13; by this arrangement, the seine gates cannot be swung around so far as would injure the same. To each ring 12 is attached chain 14. The chain 14 passes around sheave 13 and is fastened to a ring 15. Two guy ropes or lines 16 are employed, one for each gate. One end of guy rope 16 is fastened at 17 (Fig. 3) to a gate and the other end is fastened to ring 15. A hauling cable 18 is fastened to ring 15 of each gate unit and the cables 18 pass up to the trawler 19 (Fig. 1) and are attached to winch 20. Therefore, it will be seen that in operation, the taut cables 18 hold the seine gates in an open position for operation, with the gates securely fastened for maintaining the open position. However, by loosening up on cables 18 the gates can be folded in on dotted lines A—A, and closed entirely, for closing the primary cage or section 1, when the operator desires.

While I have shown the sides and top of the primary section as slatted, it will be obvious that I may make the whole section of a mesh structure (not shown), without departing from the scope of the invention.

In the bottom of the primary section 1 is a float tank 21. This tank 21 is held preferably by lugs 22 (Fig. 6) to the frame 6. The tank 21 is comparatively large, for at times it is to act as a weight and at other times as a float, as herein described. The tank 21 is provided at its inner end with a valve casing 23 (Fig. 9), in which a valve compartment 24 is formed. Valve compartment 24 communicates through ports 25 with the interior of tank 21. A sectional tube 26 extends down into the valve compartment, and on its lower end is mounted a float valve 27. Float valve 27 rests at times upon valve seat 28. Water, such as sea water can enter inlet 29 and thence pass into the valve compartment 24 and from this compartment pass through ports 25 into tank 21 until it is partly filled. Then when the operator wants to use tank 21 to float the apparatus, he can cause compressed air to be forced through the air hose 30 into sectional tube 26, whereby a sufficient amount of air will be maintained to hold the float valve 27 on seat 28, while at the same time air passes through air port 31 into valve compartment 24 and thence through ports 25 into tank 21, forcing all water out of said tank through the drain valve 32. When air pressure is removed from air hose 30, and the apparatus is in the water, the float valve 27 will move up to an unseated position, whereupon the sea water will flow into the valve casing and then into the tank, as hereinbefore described, for materially assisting in sinking the apparatus to an operative position on the bed of the body of water. When the supply of air under pressure to compartment 24 is stopped, the air in said compartment 24 is exhausted into empty pipe 30, and water will enter through inlet 29 in sufficient quantity to cause the float 21 to sink.

The trailer or auxiliary section 2 is provided on its outer end with an angle female flange 33, and the inner end of the primary section 1 is provided with an angle male flange 34; the male flange 34 fits into the female flange 33, producing an overlapping or coupler effect, bridging the connection of the two units or sections 1 and 2. The auxiliary section is provided with an air tank 35 (Fig. 4), in which tank is air compartment 36. This tank 35 has a runner-like bottom 37, to facilitate its sliding along the bottom of the gulf or ocean. The forward end of air tank 35 is upwardly bowed at 38 (Fig. 4), for facilitating this runner-like operation.

A pair of jaws 39 is employed for hooking into the auxiliary section 2 for holding it assembled with the primary section 1. Each jaw 39 is pivotally mounted at 40 (Fig. 7) upon bracket link 41. Bracket links 41 are pivotally mounted at 42a upon the frame 6. The inner ends of jaws 39 are connected at 42 to transverse rod 43 (Fig. 6) on which rod 43 is mounted the lower end of operating link 44. Operating link 44 extends upwardly through a sleeve 45, and a removable lock pin 46 (Fig. 2) is utilized to hold the link 44 in a fixed position, as when jaws 39 are in their locking position, holding the auxiliary section upon the primary section. The outer ends of the jaws extend through jaw-receiving slots 47 formed in the bottom of the primary section 1. By removing lock pin 46 and drawing slightly upward on operating link 44, the operator will cause the outer ends of jaws 39 to be removed from slots 47, whereupon the trailer or auxiliary section 2 can be detached from the primary section 1.

To protect the latching device comprising said jaws 39, I secure at 48, Fig. 2, a pan-like shield 49; this shield 49 greatly protects the locking device from injury.

By the novel construction of the runner-like bottom of the auxiliary section and the slight inclining upwardly of the inner portion of the primary section, an apparatus is formed with substantially a bowed-up central section, which prevents suction on the bottom of the gulf or ocean, and thereby greatly improves the operation of the apparatus.

In the auxiliary section 2 is a swinging gate 50 (Fig. 4), which is preferably pivoted at 51. An operating rope or cable 52 is fastened at its inner end to the outer end 53 of said gate, and the rope 52 is adapted to be wound around hook device 54. By loosening the rope 52 from hook device 54 the operator can raise or lower the gate 50 as desired. Usually the gate is raised to let the catch or shrimp move back from the primary section into the trailer or auxiliary section.

When the apparatus is raised to the top of the water a person can get from the trawler 19 onto the catwalk 55 (Fig. 3) for the purpose of hooking a grapple 56 (Fig. 1) into chain 57, whereby the apparatus can be lifted to any desired position. By drawing upwardly on chain 57, seine gates 3 preferably being closed, the catch will be dumped into the auxiliary section 2, and then operator can lower gate 50, in trapping the catch in the auxiliary section. Then the rings 58 can be engaged by suitable lifting means to bring the auxiliary section containing the shrimp or catch onto the trawler. On the trawler 19 I provide tracks 59 for drawing the entire apparatus or any section thereof onto the trawler, as desired.

Referring to Figure 6: Cork 60 may be placed on the frame at substantially the sides of the float tank 21, which cork assists in creating greater buoyancy to the apparatus.

From the foregoing description and the accompanying drawings, it will be apparent that each section of the apparatus is provided with buoyant means, as air tanks 21 and 35. Of course, air tank 21 also is used as a weight tank when filled with water.

If the operator desires he can bring the entire apparatus along side of the trawler by means of filling the float tank 21 full of air, (through the medium of the air hose 30) and the derrick with its grapple 56. Then when he wishes to lower the apparatus to the fishing grounds, he can stop pumping air into the hose 30, whereupon water will enter the tank 21 as hereinbefore described, causing the apparatus to sink to its fishing position on the bottom. The function of the air tank 35 is to evenly balance, so to speak, the weight of the auxiliary section 2, so that it can be equally as easily sunk or raised, the controlling feature of sinking and raising the entire apparatus residing in the filling of tank 21 with water, or with air, as the case may be.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. In a shrimp catching apparatus, the combination of a cage-like section provided on its outer end with hinged seine gates, ropes and means connecting said ropes at their outer ends to the outer portion of said gates, chains connected at their inner ends to said ropes, hauling cables connected at their inner ends to said chains, and guy ropes connected at their inner ends to said seine gates and at their outer ends to said hauling cables.

2. In a shrimp catching apparatus, the combination of a cage-like section provided on its outer end with hinged seine gates, head blocks on the outer portions of and fastened to the outer faces of said seine gates, ropes fastened at their outer ends to said head blocks, said ropes provided on their inner ends with stop links, sheaves on said cage-like section, chains passing over said sheaves, said chains having their inner ends connected to said stop links, said chains provided on their outer ends with rings, guy ropes connected at their inner ends to the outer portions of said seine gates, said guy ropes having their outer ends connected to said last-mentioned rings, and hauling cables connected at their inner ends to said last-mentioned rings.

3. In a shrimp catching apparatus, the combination of a section provided on its bottom with a tank, said tank provided at one end with a valve casing, said valve casing provided therein with an inlet valve, a tube having an air port connected to said inlet valve, said tank and valve casing provided with ports opening into said tank whereby water or air from the valve casing can pass into said tank, and a drain valve on the bottom of said tank.

4. In a shrimp catching apparatus, the combination of a section provided on its bottom with a tank, said tank provided at one end with ports, said tank provided with a valve casing opening upon said ports, a valve seat in said valve casing, a sectional tube extending down through the top of said valve casing into said valve casing, said sectional tube provided with an air port, a float valve slidably mounted in the lower end of said sectional tube and being adapted to engage said valve seat, an air hose mounted on the outer end of said sectional tube, and a drain valve on the bottom of said tank.

5. In a shrimp-catching apparatus, the combination of a primary section, an auxiliary section provided with slots formed in its bottom portion, bracket links pivotally mounted at their inner ends upon said primary section, a pair of jaws pivotally mounted near their center upon the outer ends of said bracket links, said jaws having their outer ends normally positioned in said slots of the auxiliary section, a rod fixedly connecting the inner ends of said jaws, an operating link secured at its lower end to said rod and extending up through said primary section, and manually operated locking means on the top of said primary section and engaging said operating link for holding same in a fixed position, whereby said jaws are held stationary and the auxiliary section retained in an assembled position with said primary section.

6. In a shrimp-catching apparatus, the combination of a section provided on its bottom with a tank, said tank provided at its inner end with a valve casing, said tank and valve casing being provided with a plurality of ports near their top, said valve casing provided in its bottom with a valve opening and with a valve seat around said opening, an air hose connecting tube extending through the top of said valve casing and down into said valve casing terminating near said valve seat, said tube being provided with an air port contiguous to said plurality of ports, a float valve normally seated upon said valve seat and having a portion extending into said tube, and a drain valve formed on the bottom of said tank.

HENRY L. MILLER.